Nov. 4, 1930.  C. G. MUNTERS  1,780,272
REFRIGERATION
Filed April 2, 1928
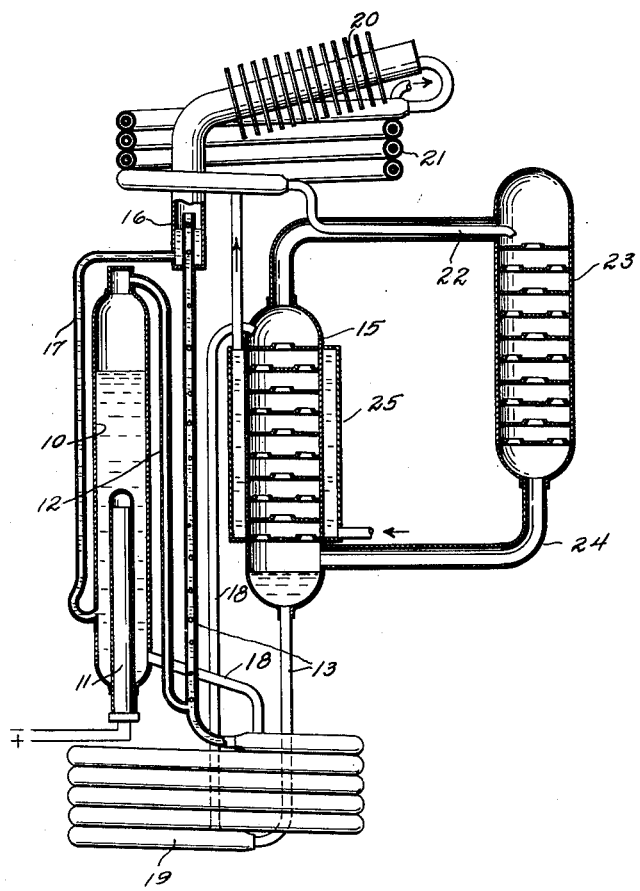
INVENTOR
Carl Georg Munters
BY
Wm T Hedlund
his ATTORNEY Patented Nov. 4, 1930

1,780,272

UNITED STATES PATENT OFFICE

CARL GEORG MUNTERS, OF STOCKHOLM, SWEDEN, ASSIGNOR TO ELECTRO X SERVEL CORPORATION, OF NEW YORK, N. Y., A CORPORATION OF DELAWARE

REFRIGERATION

Application filed April 2, 1928, Serial No. 266,861, and in Germany April 7, 1927.

The present invention relates to refrigeration and particularly to refrigerating apparatus of the absorption type and still more paticularly to method and means for circulating absorption liquid in an absorption type apparatus wherein a pressure equalizing medium, preferably an inert gas, is used, in the presence of which the refrigerant or cooling agent evaporates.

The invention consists essentially in the lifting of absorption liquid from one level to another in a system wherein a constant or substantially constant pressure exists by means of vapor introduced into an upwardly flowing column of liquid, which vapor amounts preferably to the complete generation of refrigerant.

The nature of the invention will be apparent from the following description taken in connection with the accompanying drawing which shows, more or less diagrammatically, an apparatus for carrying out the invention.

On the accompanying drawing, reference character 10 designates the boiler or generator which contains ammonia or other refrigerant in solution in an absorption liquid such as water. The generator is heated by means of a source of heat 11, an electric heater being shown for purposes of illustration. In the generator refrigerant vapor, hereinafter designated as ammonia, is expelled from solution and passes through conduit 12 and is introduced into liquid in conduit 13. Conduit 13 is connected at one end to the bottom of absorber 15 and at the other end projects into an elevated receiver 16. This receiver is designated as elevated because it is higher than the generator and is preferably also higher than the absorber. Conduit 12 connects with conduit 13 at a point below the normal level of liquid in the absorber. The vapor introduced into liquid in conduit 13 lightens the column of liquid in conduit 13 and there is an upward flow of liquid in conduit 13 into receiver 16. In receiver 16 the ammonia vapor separates from the liquid and the liquid passes through conduit 17 to the lower part of the generator. A conduit 18 is connected at one end to the lower part of the generator and at the other end to the upper part of the absorber. Conduits 13 and 18 are arranged in heat exchange relation to form a heat exchanger 19 which serves to transfer heat between the stronger absorption liquid passing through conduit 13 and the weaker absorption liquid passing through conduit 18 to the absorber.

Vapor of ammonia passes from receptacle 16 upwardly into rectifier 20 and thence through condenser 21 where it is liquefied and on through conduit 22 into evaporator 23. In the evaporator the ammonia diffuses into an inert gas, preferably hydrogen, and the mixture of ammonia and hydrogen thus formed passes downwardly through the evaporator and through conduit 24 into the absorber 15. Circulation is maintained between the evaporator and the absorber in the manner described in Patent No. 1,609,334 granted December 7, 1926. While the present invention is shown as embodied in an apparatus of the type shown in this patent, it will be understood that other arrangements may use the invention. The absorber is equipped with a cooling jacket 25 through which cooling water passes, which cooling water also serves to cool the condenser 21.

What I claim is:

1. Refrigerating apparatus comprising a generator, an absorber situated with respect to the generator so that the normal liquid level in the generator is higher than the liquid level in the absorber, an elevated receiver situated above the generator and above the absorber, a conduit connecting the bottom of the absorber with the elevated receiver, a conduit connecting the vapor space of the generator with a point in said conduit below the normal level of liquid in the absorber and a conduit connecting the receiver with the generator.

2. Refrigerating apparatus comprising a generator, a condenser, an evaporator, an absorber, a receiver situated above the generator and above the absorber, the aforementioned parts being interconnected to form a system wherein a refrigerant, an absorption liquid and an inert gas are circulated, said system including a conduit connecting the bottom of the absorber with the elevated receiver, a conduit connecting the vapor space of the generator with a point in said conduit below the normal level of liquid in the absorber and a conduit connecting the receiver with the generator.

In testimony whereof I hereunto affix my signature.

CARL GEORG MUNTERS.